US007730027B2

(12) United States Patent
Willenborg et al.

(10) Patent No.: US 7,730,027 B2
(45) Date of Patent: Jun. 1, 2010

(54) GRAPHICAL TRANSFORMATION OF DATA

(75) Inventors: Kai Willenborg, Neulussheim (DE);
Joachim Doersam, Birkenau (DE);
Karin Voss, Heidelberg (DE)

(73) Assignee: SAP AG, Walldorf (DE)

(*) Notice: Subject to any disclaimer, the term of this patent is extended or adjusted under 35 U.S.C. 154(b) by 357 days.

(21) Appl. No.: 11/016,585

(22) Filed: Dec. 16, 2004

(65) Prior Publication Data
US 2006/0136447 A1 Jun. 22, 2006

(51) Int. Cl.
*G06F 7/00* (2006.01)
*G06F 17/00* (2006.01)
(52) U.S. Cl. .................. 707/610; 707/640
(58) Field of Classification Search .............. None
See application file for complete search history.

(56) References Cited

U.S. PATENT DOCUMENTS

| 5,892,949 | A  | * | 4/1999 | Noble ............... 717/125 |
| 5,970,490 | A  | * | 10/1999 | Morgenstern ........ 707/10 |
| 6,604,110 | B1 | * | 8/2003 | Savage et al. ....... 707/102 |
| 6,636,873 | B1 | * | 10/2003 | Carini et al. ........ 707/201 |
| 6,678,691 | B1 | * | 1/2004 | Kikkers ............ 707/102 |
| 7,185,317 | B2 | * | 2/2007 | Fish et al. ......... 717/121 |
| 7,325,027 | B2 | * | 1/2008 | Grow et al. ........ 709/201 |
| 7,516,440 | B2 | * | 4/2009 | Upton .............. 717/106 |
| 2002/0059566 | A1 | * | 5/2002 | Delcambre et al. ... 717/146 |
| 2003/0140055 | A1 | * | 7/2003 | Doney et al. ........ 707/101 |
| 2004/0181753 | A1 | * | 9/2004 | Michaelides ......... 715/523 |
| 2004/0221088 | A1 | * | 11/2004 | Lisitsa et al. ....... 710/316 |
| 2005/0050068 | A1 | * | 3/2005 | Vaschillo et al. ..... 707/100 |
| 2006/0059115 | A1 | * | 3/2006 | Gutfleisch et al. ..... 707/1 |

OTHER PUBLICATIONS

"Performance Tuning for Queries with Aggregates ASAP for BW Accelerator" Documentation on using Aggregates in SAP BW, Document Version 1.0 of Jun. 2000.*

* cited by examiner

*Primary Examiner*—Hosain T Alam
*Assistant Examiner*—Usmaan Saeed
(74) *Attorney, Agent, or Firm*—Mintz, Levin, Cohn, Ferris, Glovsky & Popeo, P.C.

(57) ABSTRACT

A system and method for transforming data from a data source for use in a target application are disclosed. In one embodiment, a system includes a user interface and a global data flow model representing a process of moving the data from the data source to the target application. The system further includes a graphical view generator that generates a local view of at least a portion of the global data model for the use interface. The local view is configured for manipulation by a user of the user interface. The system further includes a transformation engine configured to integrate a manipulated local view into the global data flow model. In one method, receiving data from a data source is received, and one or more entities associated with the data are determined, where each entity defines a storage structure. At least a portion of the one or more entities is selected for defining a storage structure of a target system, and a target storage is generated based on the at least portion of the one or more entities.

12 Claims, 4 Drawing Sheets

GRAPHICAL TRANSFORMATION OF DATA

BACKGROUND

Business analytics are a subset of analytical applications used to improve business processes by operationalizing decision-making processes. Using modern business analytics, it is possible to quickly get an overview on aggregated data, such as key performance indicators, with added functions of drill-down and drill-through to more detailed information. To provide the data for analysis, business analytics extract, transform, and integrate data from multiple sources. Business analytical applications may apply complex formulae and theories to data that represents past and current trends to generate predictions that can be used to improve business processes, and to unify data that comes from different sources for faster analytics.

Business analytics may include customer relationship analytics, enterprise analytics, supply chain analytics, and marketplace analytics. Customer relationship analytics measure and optimize customer relationships, and can include campaign management, market exploration, and customer retention analysis. Enterprise analytics typically include planning and simulation tools for enterprise applications. Supply chain analytics may include supplier evaluation, spending optimization, demand aggregation, strategic sourcing, inventory analysis, and manufacturing analysis. Marketplace analytics may yield insights about usage of marketplace offerings through bidding, auctioning, and traffic analysis.

In a business analytics application, data often needs to be translated or transformed from a source system's format into a different format for, among other things, unification of multiple data sources and optimized access in analytical applications. For example, data from an SAP R/3 or a Siebel ERP application would need to be transformed for use in an SAP Business Information Warehouse InfoCube. While most conventional business analytics applications include a user interface for creating record transformations to data, these user interfaces are not optimized for creating and providing representations of structure transformations. In data warehouse applications, structural transformations and record transformations are usually separate transformation steps, enlarging the data flow model and making separate user interfaces necessary. Further, present business analytics applications do not provide separate storage of local user interface views having separate layouts.

SUMMARY

A data flow model defines the process of data being moved from a source storage (e.g. a file) into a target storage (e.g. a SAP Business Warehouse InfoCube), even if via several other transient or persistent storages. If these storages have different structures, the data has to be transformed during the data transfer, which is also reflected in the data flow model. Disclosed herein is a system and method for easily (i.e. intuitively and offering a good overview) and quickly (i.e. with as little interaction steps as possible) creating such a data flow model.

In one embodiment, a system includes a user interface and a global data flow model representing a process of moving the data from the data source to the target application. The system further includes a graphical view generator that generates a local view of at least a portion of the global data model for the use interface. The local view is configured for manipulation by a user of the user interface. The system further includes a transformation engine configured to integrate a manipulated local view into the global data flow model.

In another embodiment, a data transformation method includes receiving data from a data source, and determining one or more entities associated with the data, where each entity defines a storage structure. The method further includes selecting at least a portion of the one or more entities for defining a storage structure of a target system, and generating a target storage based on the at least portion of the one or more entities.

Multiple users can work on their own subset of objects of a data flow model. They can have their own view, providing their desired semantic. Nevertheless, they can all work on the same global data flow model. Since in data flow models structure transformations are more common than record transformations, the new user interface is more intuitive and reduces the number of necessary interaction steps significantly. The present invention makes it easier to transform data for various business software applications, including business analytics programs.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

DETAILED DESCRIPTION

A data flow model defines how data is moved from a source storage (e.g. a file) into a target storage (e.g. a SAP Business Warehouse InfoCube), including moving through several other transient or persistent storages. If these storages have different structures, the data has to be transformed during the data transfer, which is also reflected in the data flow model.

Figure 1:
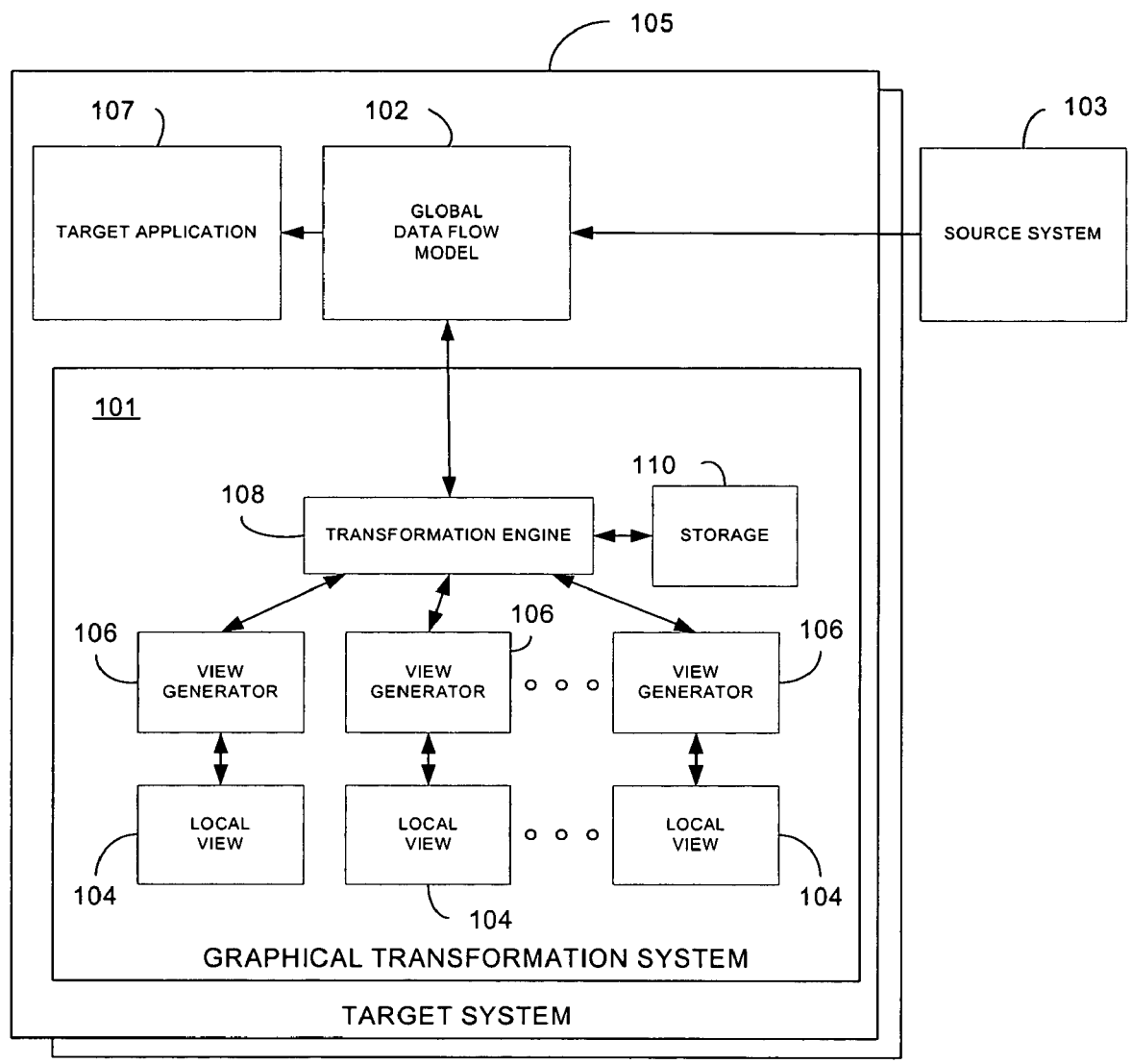
FIG. 1 is a functional block diagram of a data flow model transformer system.

FIG. 1 is a functional block diagram of a data transformation system 100 for efficiently processing data from a source system 103 that is received and transformed by a target system 105. The target system 105 includes a target application 107 that uses the transformed data, such as a business analytics application. Transformations of the data are represented by a global data flow model 102, which represents a group of objects that define data moved from one or more source systems 103 to one or more target systems 105. The global data flow model 102 defines transformations, i.e. structural and record transformations, that are made to the data as it is moved from the source system(s) 103 to the target system(s) 105.

The data transformation system 100 includes a graphical transformation system 101 that enables data to be graphically represented in multiple, simultaneous instances for independent transformation to the data based on graphic transformations to the data representations. The graphical transformation system 101 includes a number of local views 104, each providing a user a customized user interface view of the global data flow model 102 according to a desired semantic. Each local view 104 allows a user to view and work on a subset of objects of the global data flow model 102.

The subset of the global data flow model 102 may correspond to the entire global data flow model 102 for one or more users. Often, users are interested in only a part of the global data flow model 102. For each local view 104, the layout and data flow model visualization can differ. Changes to each local view 104 are saved in the global data flow model 102, and reflected in other local views 104 in which subsets of the global data flow model 102 correspond.

The local views 104 are generated by a view generator 106, such as a graphics application or graphical user interface program. A transformation engine 108 communicates with each view generator 106 to transform the selected subset of the global data flow model 102 into each local view 104, to disseminate data transformations to the view generators 106, and to receive and store to the global data flow model 102 the representative graphical changes made at the local views 104. The transformation engine 108 also selects the best entities of the global data flow model to store in a storage 110 for persistence of the data flow model information.

Figure 2:
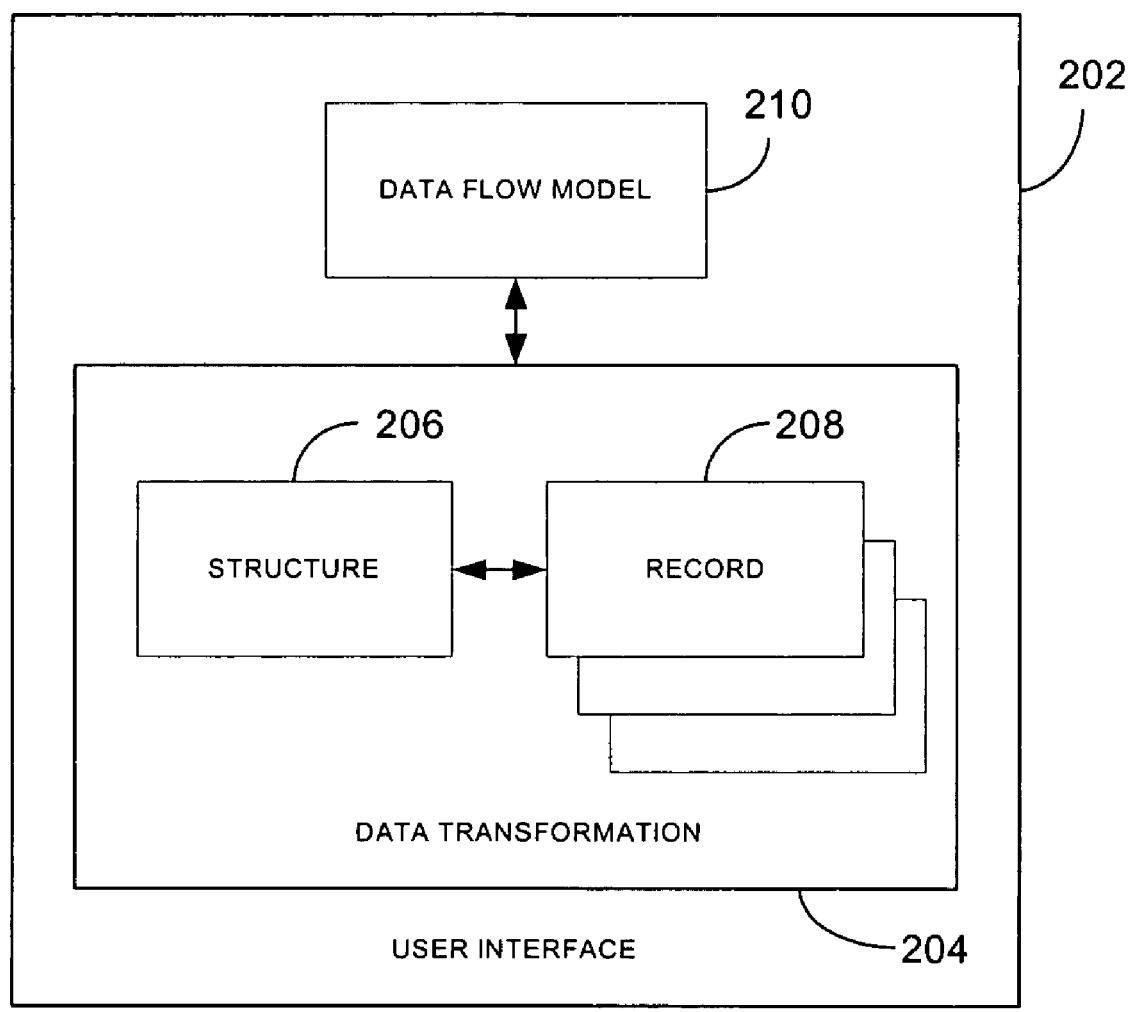
FIG. 2 is a block diagram of a graphical transformation system.

FIG. 2 is a block diagram showing a graphical transformation system 200 having a user interface 200 in which structure transformations 206 and one or more record transformations 208 are defined in a data transformation area 204 of a user interface 202. Transformations to the structure 206 and record 208 of data are now defined coincidentally in the user interface 202 to allow a user to define both transformations at substantially the same time if desired. The user interface 202 thus offers the possibility to define structure transformations 206 and several kinds of record transformations 208 together, without making the definition of a structure transformation 206 more difficult than if the record transformations 208 were not being made and thus unavailable. The associated data flow model 210 is economized, making separate user interfaces for structure transformations 206 and record transformations 208 unnecessary.

Using the graphical transformation system 200, multiple users can work on their own subset of objects of the data flow model 210. These user can each have their own view, via the user interface 202, which provides a desired or selected semantic of the data flow model 210. Multiple users can each work on the same global data flow model 210. Further, since in data flow models the structure transformations 206 are more common than record transformations 208, the user interface 202 with data transformation area 204 is more intuitive, and significantly reduces the number of required interaction steps by the user.

Figure 3:
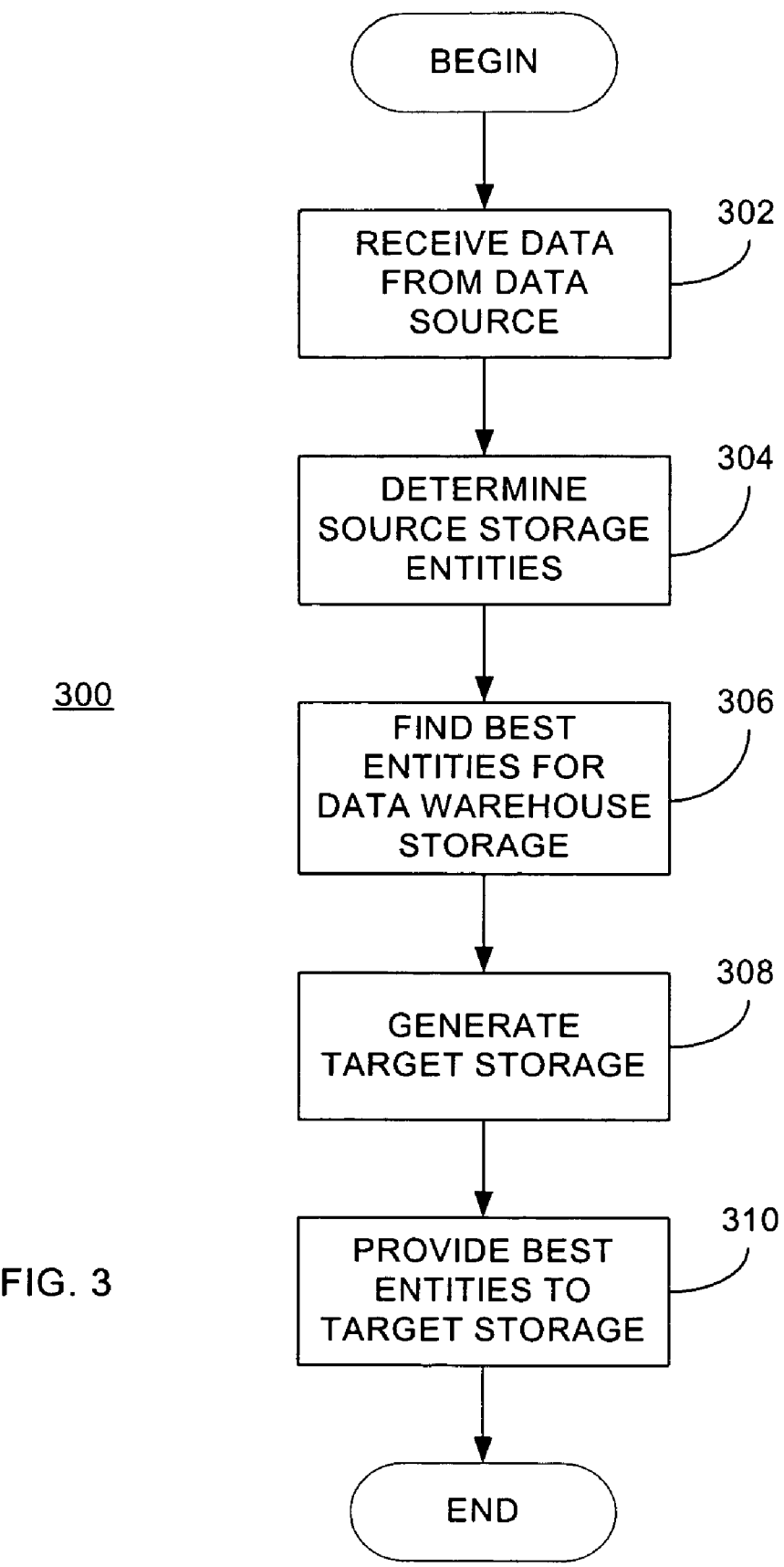
FIG. 3 illustrates a method for graphically transforming data

The fields of a storage in a data warehouse refer to entities. The information about entities is usually not provided by external data sources. FIG. 3 illustrates one embodiment of a method 300 for graphically transforming data, by which a target storage can be created very quickly based on a source storage. At step 302, data is received from a data source.

The data from the data source typically does not refer to entities to define the data source storage. Therefore, at step 304, the source storage entities are determined. At step 306, the best entities for a receiving data warehouse storage are determined. At step 308, the target storage is created based on the best entities determined for the receiving data warehouse storage. Once created, the target storage receives the data at step 310. Accordingly, for each field of the data source, the best suitable entity for the data warehouse storage is found, allowing a user to create a target storage very quickly.

Figure 4:
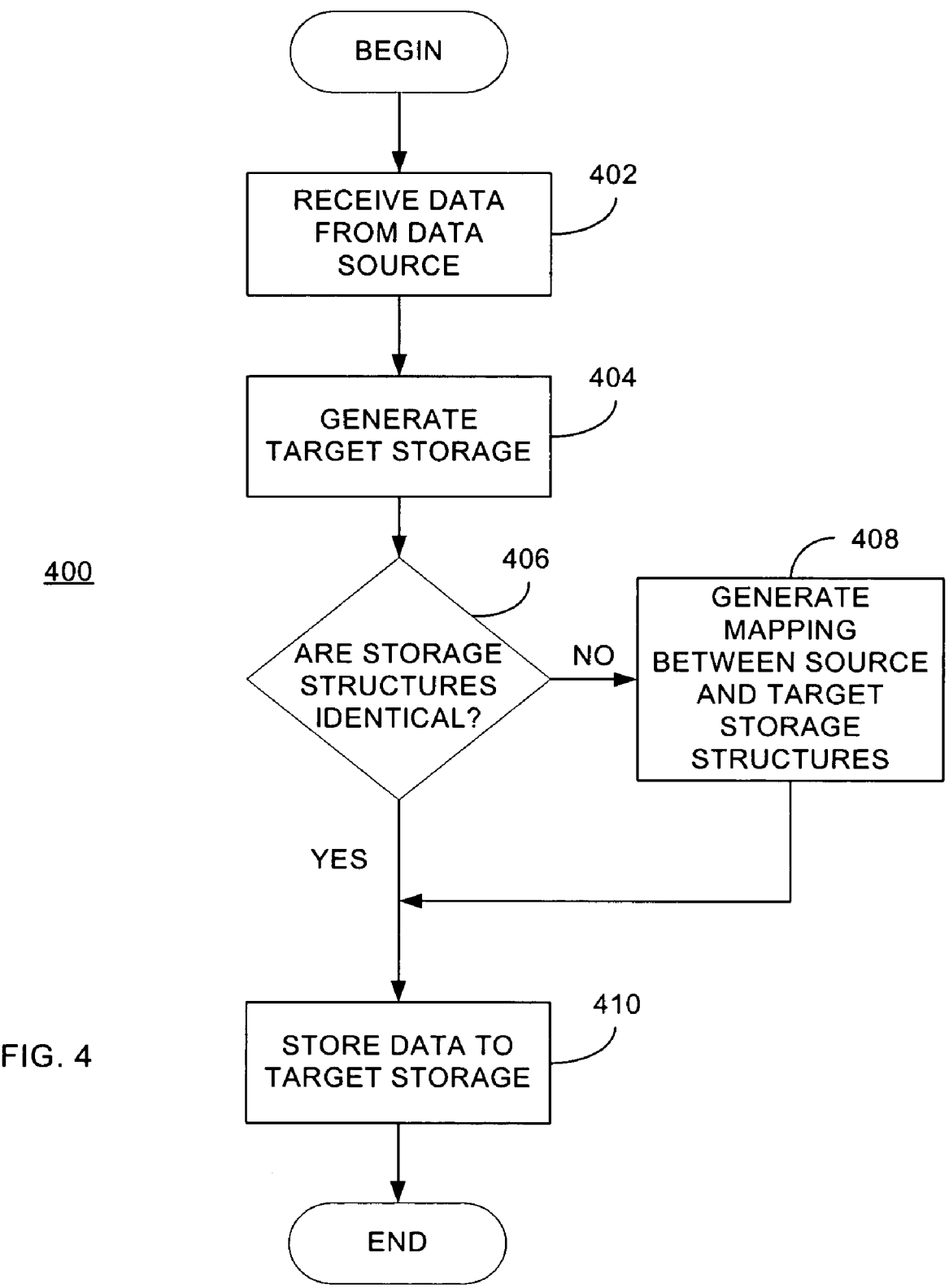
FIG. 4 shows a method for automatically mapping data structures from a source storage to a target storage Like reference symbols in the various drawings indicate like elements.

If in a transfer step from a source system to a target system the structures of the source storage and the target storage are not identical, a one-to-one mapping cannot be performed. FIG. 4 shows a method 400 for automatic mapping of data structures from a source storage to a target storage for faster creation of data flows. At block 402, data is received at a target system from a data source. At block 404, a target storage is generated for receiving the data structures of the data.

At block 406, the structures of the source storage are compared to the structures of the target storage to determine whether they are identical. If they are not identical, i.e. if the data structures of the target storage differ from the data structures of the source storage for the data, then at block 408 a mapping is generated. The mapping provides a map between the structures of the source storage and the structures of the target storage, so that data that has been transformed from the source system to the target system can be easily stored in the target system. If the structures are identical, or by using the mapping, the data is stored in the structures of the target storage at block 410.

Although a few embodiments have been described in detail above, other modifications are possible. The process flows depicted in FIGS. 3 and 4 may be executed in a different order than described and still fall within the scope of the description. Other embodiments may be within the scope of the following claims.

The invention claimed is:

1. A system comprising:
   a global data flow model representing a process of moving data from one or more data sources to a target application at a target system, the global flow model defining structural and record transformations to the data, the structural transformations representing mapping from a second storage hosting the data at the source system to a first storage at the target system;
   a first user interface and a second user interface;
   a first view generator that generates a first local view of at least a first portion of the global data flow model for display at first user interface, the first local view presenting a first user-specific subset of the graphical data representations in a first data flow model visualization configured for manipulation by a first user of the first user interface;
   a second view generator that generates a second local view of at least a second portion of the global data flow model for display at second user interface, the local view presenting a second user-specific subset of the graphical data representations in a second data flow model visualization configured for manipulation by a second user of the second user interface;
   a transformation engine communicating with the first view generator to receive at least one first change made to the at least first portion of the global data flow model, the at least one first change comprising a first structural transformation and a first record transformation to the data that are entered substantially simultaneously by interaction of a first user with the first user-specific subset of the graphical data representations in the first local view, the transformation engine also communicating with the second view generator to update the second local view based on the at least one change if the second user-specific subset of the graphical data representations includes the data affected by the first change; and
   wherein the first storage is connected to the transformation engine for receiving data transformations represented by the global data flow model, the first storage, the transformation engine, the first and second view generators, and the target application are included in the target system.

2. A system in accordance with claim 1, wherein the one or more data sources represent a file and the target application represents a business warehouse infocube.

3. A data transformation system, comprising:
a source system providing data;
target system configured to receive the data from the source system;
a global data flow model defining how the data are moved from the source system to the target system, the global data flow model defining structural and record transformations to the data, the structural transformations representing mapping from a second storage hosting the data at the source system to a first storage at the target system;
a first view generator that generates a first local view for display at a first user interface, the first local view presenting a first user-specific subset of the graphical data representations in a first data flow model visualization;
a second view generator that generates a second local view for display at a second user interface, the second local view presenting a second user-specific subset of the graphical data representations in a second data flow model visualization that differs from the first data flow model visualization;
a transformation engine communicating with the first view generator to receive at least one first change made to the data represented by the first user-specific subset of the graphical data representations, the at least one first change comprising a first structural transformation and a first record transformation to the data that are entered substantially simultaneously by interaction of a first user with the first user-specific subset of the graphical data representations in the first local view, the transformation engine also communicating with the second view generator to update the second local view based on the at least one change if the second user-specific subset of the graphical data representations includes the data affected by the first change; and
wherein the first storage is connected to the transformation engine for receiving data transformations represented by the global data flow model, the first storage, the transformation engine, the first and second view generators, and a target application that uses the data are included in the target system.

4. A system in accordance with claim 3, further comprising a graphical transformation system that represents the data with graphical data representations for display in the first and the second local view and captures data transformations entered by users through interaction with the graphical data representations.

5. A system in accordance with claim 4, wherein the graphical transformation system updates the global data model based on the manipulation of the at least subset of the global data model from the local view.

6. A system in accordance with claim 5, further comprising a storage for storing a representation of the global data model.

7. A system in accordance with claim 4, wherein the transformation engine integrates data transformations entered by users via the first local view and the second local view into the global data flow model.

8. A system in accordance with claim 7, further comprising a storage connected to the transformation engine for receiving the data transformations represented by the global data flow model.

9. A system in accordance with claim 8, wherein the transformation engine disseminates the data transformations to the first view generator and the second view generator.

10. A data transformation method comprising:
defining with a global data flow model how data are moved from one or more source data storages to one or more target systems, the one or more source systems having data structures that differ from those of the one or more target systems;
representing the data with graphical data representations in a graphical transformation system implemented on one or more processors;
generating a first local view for display at a first user interface and a second local view for display at a second user interface, the first local view presenting a first user-specific subset of the graphical data representations in a first data flow model visualization, the second local view presenting a second user-specific subset of the graphical data representations in a second data flow model visualization that differs from the first data flow model visualization, the first local view being generated by a first view generator of the graphical transformation system and the second local view being generated by a second view generator of the graphical transformation system;
receiving at least one first change made to the data represented by the first user-specific subset of the graphical data representations, the at least one first change comprising a first structural transformation and a first record transformation to the data that are entered substantially simultaneously by interaction of a first user with the first user-specific subset of the graphical data representations in the first local view;
creating a target storage for the data represented by the first user-specific subset of the graphical data representations;
saving the at least one first change to the global data flow model such that the global data flow model comprises a mapping for the data between the one or more source storages and the target storage; and
updating the second local view based on the at least one change if the second user-specific subset of the graphical data representations includes the data affected by the first change.

11. A method in accordance with claim 10, further comprising creating the target storage according to a determination of one or more best entities by the graphical transformation system.

12. A method in accordance with claim 10, further comprising transforming the data based on the created target storage structure.

* * * * *